Patented Oct. 28, 1952

2,615,844

UNITED STATES PATENT OFFICE 2,615,844

MINERAL OIL COMPOSITIONS CONTAINING ESTERS OF THIOPHENE-MODIFIED COPOLYMERS OF MALEIC ANHYDRIDE WITH ALIPHATIC VINYL COMPOUNDS

John J. Giammaria, Woodbury, N. J., assignor to Socony-Vacuum Oil Company, Incorporated, a corporation of New York No Drawing. Application November 14, 1949, Serial No. 127,267

11 Claims. (Cl. 252—48.6)

This invention relates generally to improved lubricating oil compositions. More particularly, it relates to lubricating oil compositions containing alcohol and amine derivatives of thiophene-modified copolymers of maleic anhydride and aliphatic vinyl compounds.

The copolymerization of maleic anhydride with various aliphatic vinyl compounds has been shown in the prior art. The esterification of the polymer products with alcohols and amines has also been shown. However, insofar as is known, the copolymerization has never been carried out in the presence of thiophene, or an alkyl thiophene, to produce a thiophene-containing polymer product.

I have now found that the copolymers produced by copolymerizing maleic anhydride with an aliphatic vinyl compound, such as a vinyl ester, vinyl ether, acrylic ester, methacrylic ester, allyl ether, allyl ester or an alpha-olefin, in the presence of thiophene or an alkyl-substituted thiophene, contain appreciable amounts of sulfur, as the result of the interaction of the thiophene compound with the other two reactants. I have further found that these thiophene-modified polymers may be reacted with relatively long-chain, primary, normal, aliphatic alcohols to form esters, or with relatively long-chain, aliphatic, primary or secondary amines to form amides or imides; and that the derivatives so produced are effective viscosity index improvers and pour point depressants for lubricating oils. It is, therefore, the primary object of this invention to provide a method for producing such thiophene-modified copolymers and alcohol and amine derivatives thereof.

It is a further object to provide improved lubricating oil compositions containing alcohol and amine derivatives of the said thiophene-modified copolymers. Other objects will be apparent from the following detailed description of the invention.

As already indicated, the copolymers and alcohol and/or amine derivatives thereof contemplated herein are prepared by first copolymerizing maleic anhydride with an aliphatic vinyl compound in the presence of thiophene, or an alkyl thiophene, and then esterifying the interpolymer product with an alcohol or amine, particularly an aliphatic alcohol or amine.

As non-limiting examples of the aliphatic vinyl compounds suitable for use in the polymerization reaction, the following may be mentioned:

(a) Vinyl ethers, such as vinyl ethyl ether, vinyl butyl ether, vinyl octyl ether, vinyl dodecyl ether, vinyl tetradecyl ether, vinyl hexadecyl ether, vinyl octadecyl ether, vinyl octenyl ether, vinyl tetradecenyl ether, vinyl octadecenyl ether;

(b) Vinyl esters, such as vinyl acetate, vinyl butyrate, vinyl caprylate, vinyl caprate, vinyl laurate, vinyl myristate, vinyl palmitate, vinyl stearate;

(c) Acrylic esters, such as ethyl acrylate, propyl acrylate, amyl acrylate, heptyl acrylate, nonyl acrylate, undecyl acrylate, tetradecyl acrylate, hexadecyl acrylate, octadecyl acrylate, ethenyl acrylate, dodecenyl acrylate, octadecenyl acrylate;

(d) Itaconic esters, such as dimethyl itaconate, didodecyl itaconate, ditetradecyl itaconate, di-"Lorol-5" itaconate, di-"Lorol-B" itaconate;

(e) Methacrylic esters, such as methyl methacrylate, amyl methacrylate, dodecyl methacrylate, octadecyl methacrylate, tetradecenyl methacrylate;

(f) Allyl esters, such as allyl acetate, allyl butyrate, allyl caprylate, allyl caprate, allyl laurate, allyl myristate, allyl palmitate, allyl stearate;

(g) Allyl ethers, such as allyl ethyl ether, allyl octyl ether, allyl dodecyl ether, allyl tetradecyl ether, allyl hexadecyl ether, allyl octadecyl ether, allyl ethenyl ether, allyl octenyl ether, allyl tetradecenyl ether, allyl octadecenyl ether;

(h) Cycloaliphatic vinyl compounds, such as vinyl cyclohexene;

(i) Heterocyclic vinyl compounds, such as vinyl pyridine and dihydropyrane; and (j) Alpha-olefins, such as ethylene, propylene, butene-1, octene-1, dodecene-1, tetradecene-1, hexadecene-1 and heptadecene-1.

The thiophenes suitable for use in preparing the polymer products of the present invention may be represented by the general formula

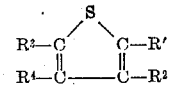

where R′, R², R³ and R⁴ represent hydrogen or alkyl groups, which may be straight or branch-chained or cycloaliphatic in structure. As typical examples of suitable thiophene compounds, there may be mentioned thiophene per se, 2-methyl thiophene, 3-methyl thiophene, 2-tertiary-butyl thiophene, 2,5-di-tertiary-butyl thiophene, 2-cyclohexyl thiophene, 2-lauryl thiophene, 2-octadecyl thiophene, 2-wax thiophene and 2,5-di-wax thiophene.

The polymerization reaction is conducted under ordinary polymerizing conditions. Thus, the reactants may be heated together, either in bulk or in the presence of a suitable solvent, such as xylene, at temperatures ranging from about 75° C. to about 150° C. A polymerization catalyst of the peroxide type, such as benzoyl peroxide, is preferably used. The reaction time varies from about 15 minutes to about 10 hours, although the reaction is usually completed in from about 1 to about 5 hours.

The amount of thiophene, or alkyl-substituted thiophene, used may be varied over wide limits. Thus, as little as 0.25 mol of thiophene for each mol of maleic anhydride and vinyl compound may be used, or the amounts may be increased to solvent proportions, such as from 2 to 6 mols per mol of maleic anhydride and vinyl compound. In general, it is preferred to use equimolar quantities of all three reactants, since in this proportion higher yields of modified copolymers, which still contain amounts of sulfur in the order of 3 to 4 weight percent, are obtained.

Typical examples of the thiophene-modified copolymers contemplated herein are the following: thiophene-modified maleic anhydride-vinyl acetate copolymer, thiophene-modified maleic anhydride-vinyl caprylate copolymer, thiophene-modified maleic anhydride-vinyl myristate copolymer, dioctyl thiophene-modified maleic anhydride-vinyl acetate copolymer, wax-thiophene-modified maleic anhydride-vinyl acetate copolymer, tetrabutyl thiophene-modified maleic anhydride-vinyl acetate copolymer, thiophene-modified maleic anhydride-vinyl stearate copolymer, allyl thiophene-modified maleic anhydride-vinyl myristate copolymer, thiophene-modified maleic anhydride-vinyl ethyl ether copolymer, allyl thiophene-modified maleic anhydride-vinyl octyl ether copolymer, chlorothiophene-modified maleic anhydride-vinyl tetradecyl ether copolymer, nitrothiophene-modified maleic anhydride-vinyl octadecyl ether copolymer, thiophene-modified maleic anhydride-ethyl acrylate copolymer, methyl thiophene-modified maleic anhydride-tetradecyl acrylate copolymer, thiophene-modified maleic anhydride-octadecenyl acrylate copolymer, di-wax thiophene-modified maleic anhydride-methyl methacrylate copolymer, thiophene-modified maleic anhydride-dimethylitaconate copolymer, thiophene-modified maleic anhydride-allyl acetate copolymer, methyl thiophene-modified maleic anhydride-allyl laurate copolymer, thiophene-modified maleic anhydride-allyl palmitate copolymer, tributyl thiophene-modified maleic anhydride-allyl ethyl ether copolymer, 3-methyl thiophene-modified maleic anhydride-allyl octyl ether copolymer, tetrabutyl thiophene-modified maleic anhydride-allyl hexadecyl ether copolymer, thiophene-modified maleic anhydride-ethylene copolymer, 1-methyl-thiophene-modified maleic anhydride-octadecene-1 copolymer, tetra-wax thiophene-modified maleic anhydride-vinyl pyridine copolymer and thiophene-modified maleic anhydride-dihydropyrane copolymer.

Alcohols suitable for esterifying the heteropolymers herein contemplated comprise primary, normal, aliphatic alcohols having from about 12 to about 18 carbon atoms. Suitable alcohols are, for example, lauryl alcohol, tridecyl alcohol, tetradecyl alcohol, pentadecyl alcohol, hexadecyl alcohol, heptadecyl alcohol, octadecyl alcohol, dodecenyl alcohol, tetradecenyl alcohol and octadecenyl alcohol.

Mixtures of primary, normal, aliphatic alcohols having an average of 12 to 14 carbon atoms per molecule may also be used. Such mixtures of alcohols are represented by those marketed by E. I. du Pont de Nemours & Co. under the trade names "Lorol-B" and "Lorol-5." These alcohol mixtures contain primary, normal, aliphatic alcohols, ranging from 10 to 18 carbon atoms, in approximately the following proportions:

|  | "Lorol-B" | "Lorol-5" |
|---|---|---|
| $C_{10}$ percent | 2.5 | 2.8 |
| $C_{12}$ do | 55.0 | 61.0 |
| $C_{14}$ do | 20.5 | 21.0 |
| $C_{16}$ do | 9.0 | 11.0 |
| $C_{18}$ do | 13.0 | 2.2 |
| Ave. No. C Atoms | 13.5 | 12.7 |

A technical grade of lauryl alcohol, as sold by the Eastman-Kodak Co., is also a suitable mixture.

The thiophene-modified copolymers esterified with the aforesaid alcohols all function as viscosity index improvers for lubricating oils. I have also found that when these copolymers are esterified with relatively pure, primary, normal alcohols containing 14 to 16 carbon atoms or with a mixture of such alcohols containing an average of about 14 carbon atoms, such as "Lorol-B," they function as pour point depressants as well as viscosity index improvers.

Amines suitable for reaction with the thiophene-modified copolymers to give the products contemplated herein include aliphatic, primary amines containing from 12 to 18 carbon atoms or the corresponding secondary amines. Such amines are available from Armour and Co. under the "Armeen" trade name. As examples of specific suitable amines there may be mentioned: lauryl amine, tridecyl amine, tetradecyl amine, pentadecyl amine, hexadecyl amine, heptadecyl amine, octadecyl amine, dihexyl amine, diheptyl amine, dioctyl amine, dinonyl amine and methyldecyl amine. A mixture of amines containing 8 to 18 carbon atoms and an average of about 12 carbon atoms per molecule, designated "Armeen CD," may also be used.

The reaction of the modified copolymers with the alcohols or amines to form esters, imides and amides may be carried out by any of the well-known standard esterification procedures. Thus, for example, the thiophene-modified copolymers and the alcohol, or amine, may be mixed together and heated in the presence of a catalyst such as sulfuric acid. A solvent medium, such as xylene, may be used if desired.

Typical examples of modified copolymer-alcohol and amine derivatives contemplated herein are the following: the lauryl ester of thiophene-modified maleic anhydride-vinyl acetate copolymer, the tetradecyl ester of thiophene-modified maleic anhydride-vinyl caprylate copolymer, the octadecyl ester of allyl thiophene-modified maleic anhydride-vinyl myristate copolymer, the lauryl amine derivative of 3-methyl thiophene-modified maleic anhydride-vinyl laurate copolymer, the tetradecyl ester of wax-thiophene-modified maleic anhydride-vinyl ethyl ether copolymer, the tetradecyl amine derivative of dibutyl thiophene-modified maleic anhydride-vinyl octyl ether copolymer, the tetradecyl ester of chlorothiophene-modified maleic anhydride-vinyl tetradecyl ether copolymer, the tetradecyl ester of tetrabutyl thiophene-modified maleic anhydride-vinyl acetate copolymer, the octadecyl ester of thiophene-modified maleic anhydride-ethyl acrylate copolymer, the tetradecyl ester of diwax thiophene-modified maleic anhydride-octadecenyl acrylate copolymer, the lauryl ester of 2-lauryl thiophene-modified maleic anhydride-tetradecyl methacrylate copolymer, the octadecyl ester of 2-octadecyl thiophene-modified maleic anhydride-allyl acetate copolymer, the "Lorol-B" ester of 3-methyl thiophene-modified maleic anhydride-allyl stearate copolymer, the tetradecyl ester of allyl thiophene-modified maleic anhydride-allyl ethyl ether copolymer, the "Lorol-5" ester of thiophene-modified maleic anhydride-allyl octadecenyl ether copolymer, the tetradecyl ester of 3-methyl thiophene-modified maleic anhydride-allyl tetradecyl ether copolymer, the "Lorol-B" ester of thiophene-modified maleic anhydride-ethylene copolymer, the hexadecyl ester of 1-methyl thiophene-modified maleic anhydride-octadecene copolymer, the lauryl ester of thiophene-modified maleic anhydride-vinyl cyclohexene copolymer, the tetradecyl amine derivative of tetrawax thiophene-modified maleic anhydride-vinyl pyridine copolymer and the octadecyl ester of thiophene-modified maleic anhydride dihydropyrane copolymer.

The following examples serve to illustrate the detailed preparation of a number of the products contemplated herein.

EXAMPLE I

*Thiophene-modified maleic anhydride-vinyl acetate copolymer*

Forty-nine grams of maleic anhydride (0.5 mole), 43.0 grams of freshly distilled vinyl acetate (0.5 mole), 1.0 gram of benzoyl peroxide and 240.0 cc. of thiophene (3.0 moles) were mixed and heated to 84° C. while stirring to obtain complete solution. Heating at this temperature was continued for 5½ hours during which time a brown resinous material was precipitated on the wall of the reaction flask. The clear liquid portion was decanted and the residue was dissolved in acetone. The acetone solution was poured into benzene to reprecipitate the modified copolymer which was separated by vacuum filtering and dried to a light brown powder. This modified copolymer contained 10.3% sulfur.

EXAMPLE II

*3-methyl thiophene-modified maleic anhydride-vinyl acetate copolymer*

Twenty-four and one-half grams of maleic anhydride (0.25 mole), 21.5 grams of freshly distilled vinyl acetate (0.25 mole), 0.12 gram of benzoyl peroxide and 180.0 cc. of 3-methyl thiophene (1.9 moles) were mixed and heated to 108° C. The solution gradually became cloudy. Heating at this temperature was continued for 3 hours, the modified copolymer precipitating as a yellow solid on the walls of the reaction vessel. The mixture was cooled, the liquid portion decanted and the modified copolymer was purified as described in Example I. This modified copolymer contained 13.2% sulfur.

EXAMPLE III

*3-methyl thiophene-modified maleic anhydride-vinyl acetate copolymer (1:1 mole ratio)*

Twenty-four and one-half grams of maleic anhydride (0.25 mole), 21.5 grams of freshly distilled vinyl acetate (0.25 mole), 24.5 grams of 3-methyl thiophene (0.25 mole), 1.0 gram of benzoyl peroxide and 200.0 cc. of xylene were mixed and slowly heated to 110° C. After heating at this temperature for 1½ hours, the precipitated modified copolymer was purified by dissolving in acetone and reprecipitating by pouring this solution into cold water. The modified copolymer was filtered off and dried to a light brown powder which contained 5.4% sulfur.

EXAMPLE IV

*Thiophene-modified maleic anhydride-vinyl acetate copolymer (1:1 mole ratio)*

Ninety-eight grams of maleic anhydride (1.0 mole) 86.0 grams of freshly distilled vinyl acetate (1.0 mole) 84.0 grams of thiophene (1.0 mole), 2.8 grams of benzoyl peroxide and 500.0 cc. of xylene were mixed and slowly heated to 108° C. Heating was discontinued due to vigorous refluxing. As the temperature subsided, the reaction mixture was again heated to 108° C. and held for 1 hour. The mixture was then cooled and the precipitated modified copolymer was filtered off and dried at 100° C. in a vacuum oven. The dried modified copolymer was a very fine powder containing 3.7% sulfur.

EXAMPLE V

*Thiophene-modified maleic anhydride-vinyl acetate copolymer (.5:1 mole ratio)*

A modified copolymer was prepared as described in Example IV except that one-half the amount of thiophene was used and the xylene solvent was omitted. This modified copolymer still contained 3.3% sulfur.

EXAMPLE VI

*Thiophene-modified maleic anhydride-vinyl butyl ether copolymer*

Sixteen and one-half grams of freshly distilled vinyl butyl ether (0.165 mole), 16.5 grams of maleic anhydride (0.17 mole), 1.2 grams of benzoyl peroxide and 160 cc. of thiophene were mixed and heated at reflux for 5 hours. The precipitated modified copolymer was purified as described in Example I and contained 5.8% sulfur.

EXAMPLE VII

*Thiophene-modified maleic anhydride-octene-1 copolymer*

Forty-six grams of octene-1 (0.5 mole), 49.0 grams of maleic anhydride (0.5 mole), 42.0 grams of thiophene (0.5 mole) and 1.5 grams of benzoyl peroxide were mixed and slowly heated to 105° C. After heating for 1 hour at this temperature, the mixture was cooled and the modified copolymer purified as described in Example I. The modified copolymer contained 5.5% sulfur.

EXAMPLE VIII

*Lauryl ester of 3-methyl thiophene-modified maleic anhydride-vinyl acetate copolymer*

Ten grams of the modified copolymer from Example III, 50.0 grams of lauryl alcohol (Eastman Kodak's technical grade), 0.5 cc. of concentrated $H_2SO_4$ and 100 cc. of xylene were mixed and heated to reflux in a flask equipped with a Dean-Stark moisture trap for separating the water formed during esterification. After refluxing for four hours, the xylene was gradually distilled whereby the temperature was finally raised to 180° C. The viscous residue was cooled, dissolved in benzene and filtered. The benzene was then removed by distillation followed by heating to 260° C. under 1 mm. vacuum to remove excess alcohol. The very viscous ester modified copolymer thus obtained (Product VIII) contained 2.2% sulfur and was readily soluble in lubricating oil.

EXAMPLE IX

*Lauryl ester of thiophene-modified maleic anhydride-vinyl acetate copolymer*

Ten grams of the modified copolymer from Example IV, 40.0 grams of lauryl alcohol (Eastman Kodak's technical grade), 0.5 cc. of concentrated $H_2SO_4$ and 100 cc. of xylene were mixed and treated as in Example VIII except that excess alcohol was removed by extracting it with hot ethyl alcohol instead of by distillation. The ester modified copolymer (Product IX) contained 1.5% sulfur and was readily soluble in lubricating oil.

EXAMPLE X

*Cetyl ester of thiophene-modified maleic anhydride-vinyl acetate copolymer*

Ten grams of the modified copolymer from Example IV, 40.0 grams of n-cetyl alcohol, 0.5 cc. of concentrated $H_2SO_4$ and 100 cc. of xylene were mixed and treated as in Example IX. This product was designated as Product X.

EXAMPLE XI

*Octadecyl ester of thiophene-modified maleic anhydride-vinyl acetate copolymer*

Ten grams of the modified copolymer from Example IV, 40.0 grams of n-octadecyl alcohol, 0.5 cc. of concentrated $H_2SO_4$ and 100 cc. of xylene were mixed and treated as in Example VIII. The ester copolymer (Product XI) contained 0.81% sulfur and was readily soluble in lubricating oil.

EXAMPLE XII

*"Lorol-B" ester of thiophene-modified maleic anhydride-vinyl butyl ether copolymer*

Four grams of the modified copolymer from Example VI, 20.0 grams of "Lorol-B," 0.2 gram of p-toluene sulfonic acid and 100 cc. of toluene were mixed and treated as described in Example VIII. The ester copolymer (Product XII) contained 2.32% sulfur and was readily soluble in lubricating oil.

EXAMPLE XIII

*"Lorol-B" ester of thiophene-modified maleic anhydride-octene-1 copolymer*

Fifteen grams of the modified copolymer from Example VII, 34.0 grams of "Lorol-B," 0.3 cc. of concentrated $H_2SO_4$ and 100 cc. of xylene were mixed and treated as described in Example IX. The ester copolymer (Product XIII) contained 1.54% sulfur and was readily soluble in lubricating oil.

EXAMPLE XIV

*Di-octadecyl amine derivative of thiophene-modified maleic anhydride-vinyl acetate copolymer*

Five grams of the modified copolymer from Example IV, 30.0 grams of di-octadecylamine (Armour's Am-2180) and 150 cc. of xylene were mixed and heated at reflux for 3 hours in a flask equipped with a Dean-Stark moisture trap for separating the water of reaction. Xylene was gradually removed by distillation whereby the temperature was finally raised to 200° C. The product was cooled and extracted several times with 100 cc. portions of hot ethyl alcohol to remove unreacted amine. The residue (Product XIV) after evaporation of entrained alcohol analyzed 2.26% N.

Pour point depression

The effectiveness of the products described herein as pour point depressants is illustrated by the data presented in Table I. The results were obtained in a Duo-sol refined, Mid-continent type base oil having a kinematic viscosity of 12.2 centistokes at 210° F. and an A. S. T. M. pour point of +20° F.

TABLE I

| Compound Blended in Oil | Concn. Wt. Percent | A. S. T. M. Pour Point, °F. |
|---|---|---|
| Product VIII | 0.25 | −20 |
| Do | 0.125 | −15 |
| Product IX | 0.25 | −20 |
| Do | 0.125 | −20 |
| Product X | 0.25 | −5 |
| Do | 0.125 | −5 |
| Product XII | 0.25 | −25 |
| Do | 0.125 | −25 |
| Product XIII | 0.25 | −25 |
| Do | 0.125 | −20 |
| Product XIV | 0.25 | −10 |
| Do | 0.125 | −5 |

V. I. improvement

The effectiveness of the products of the invention as viscosity index improvers is illustrated by the data in Table II. The results were obtained in an acid-refined, Mid-continent type base oil having an initial viscosity index of 80.6.

TABLE II

| Compound Blended in Oil | Concn. Wt. Percent | Kin. Vis. @ 100° F. | Kin. Vis. @ 210° F. | V. I. |
|---|---|---|---|---|
| None | 0.0 | 30.56 | 4.84 | 80.6 |
| Product VIII | 2.0 | 31.98 | 5.09 | 92.5 |
| Product XII | 2.0 | 35.03 | 5.59 | 107.0 |
| Product XIII | 2.0 | 33.22 | 5.25 | 96.3 |

The amount of the products of the invention to be incorporated in a lubricating oil will vary with the particular oil and the application for which it is intended. Thus, concentrations of from about 0.01 per cent to about 10 per cent may be used, although, generally, the desired results are obtained with concentrations of from .01 per cent to about 2 per cent. It is also contemplated that the products of the invention be incorporated in the oil in greater concentrations, i. e. above 10 per cent, to provide "concentrates" for marketing, such concentrated compositions affording a readily soluble form of the additive materials for dilution with further quantities of oil prior to actual use.

The oils in which my new additive agents are incorporated, or the oil "concentrate," may also contain other addition agents, designed to improve the character of the oil in other respects, such as corrosiveness, extreme pressure quality, detergency, etc.

Although the principles of this invention have been illustrated herein by means of certain specific examples and tests, it is not intended that the scope of the invention be limited thereby, but only as indicated in the following claims.

I claim:

1. A mineral lubricating oil containing a minor proportion, sufficient to improve the viscosity index thereof, of the product obtained by (1)

copolymerizing 1 mole of maleic anhydride with about 1 mole of an aliphatic vinyl compound in the presence of from about 0.25 mole to about 6 moles of a thiophene compound selected from the group consisting of thiophenes and alkyl thiophenes, to form a thiophene-modified copolymer product and (2) reacting the copolymer product with a compound selected from the group consisting of (a) primary, normal, saturated, aliphatic alcohols having from about 12 to about 18 carbon atoms, (b) primary and secondary, saturated, aliphatic amines having from about 12 to about 18 carbon atoms and (c) a mixture of primary, saturated, aliphatic amines containing from 8 to 18 carbon atoms and having an average of about 12 carbon atoms per molecule.

2. A mineral lubricating oil containing a minor proportion, from about 0.1 per cent to about 10 per cent, of the product obtained by (1) copolymerizing 1 mole of maleic anhydride with about 1 mole of an aliphatic vinyl compound in the presence of from about 0.25 mole to about 6 moles of a thiophene compound selected from the group consisting of thiophene and alkyl thiophenes, to form a thiophene-modified copolymer product and (2) reacting the copolymer product with a compound selected from the group consisting of (a) primary, normal, saturated, aliphatic alcohols having from about 12 to about 18 carbon atoms, (b) primary and secondary, saturated, aliphatic amines having from about 12 to about 18 carbon atoms and (c) a mixture of primary, saturated, aliphatic amines containing from 8 to 18 carbon atoms and having an average of about 12 carbon atoms per molecule.

3. A mineral lubricating oil containing a minor proportion, sufficient to improve the viscosity index thereof, of the product obtained by (1) copolymerizing 1 mole of maleic anhydride with about 1 mole of an aliphatic vinyl ether in the presence of from about 0.25 mole to about 6 moles of a thiophene compound selected from the group consisting of thiophene and alkyl thiophenes, to form a thiophene-modified copolymer product and (2) reacting the copolymer product with a compound selected from the group consisting of (a) primary, normal, saturated, aliphatic alcohols having from about 12 to about 18 carbon atoms, (b) primary and secondary, saturated, aliphatic amines having from about 12 to about 18 carbon atoms and (c) a mixture of primary, saturated, aliphatic amines containing from 8 to 18 carbon atoms and having an average of about 12 carbon atoms per molecule.

4. A mineral lubricating oil containing a minor proportion, sufficient to improve the viscosity index thereof, of the product obtained by (1) copolymerizing 1 mole of maleic anhydride with about 1 mole of an aliphatic vinyl ester in the presence of from about 0.25 mole to about 6 moles of a thiophene compound selected from the group consisting of thiophene and alkyl thiophenes, to form a thiophene-modified copolymer product and (2) reacting the copolymer product with a compound selected from the group consisting of (a) primary, normal, saturated, aliphatic alcohols having from about 12 to about 18 carbon atoms, (b) primary and secondary, saturated, aliphatic amines having from about 12 to about 18 carbon atoms and (c) a mixture of primary, saturated, aliphatic amines containing from 8 to 18 carbon atoms and having an average of about 12 carbon atoms per molecule.

5. A mineral lubricating oil containing a minor proportion, sufficient to improve the viscosity index thereof, of the product obtained by (1) copolymerizing 1 mole of maleic anhydride with about 1 mole of an aliphatic 1-olefin in the presence of from about 0.25 mole to about 6 moles of a thiophene compound selected from the group consisting of thiophene and alkyl thiophenes, to form a thiophene-modified copolymer product and (2) reacting the copolymer product with a compound selected from the group consisting of (a) primary, normal, saturated, aliphatic alcohols having from about 12 to about 18 carbon atoms, (b) primary and secondary, saturated, aliphatic amines having from about 12 to about 18 carbon atoms and (c) a mixture of primary, saturated, aliphatic amines containing from 8 to 18 carbon atoms and having an average of about 12 carbon atoms per molecule.

6. A mineral lubricating oil containing a minor proportion, sufficient to improve the viscosity index thereof, of the product obtained by (1) copolymerizing 1 mole of maleic anhydride with about 1 mole of vinyl acetate in the presence of from about 0.25 mole to about 6 moles of 3-methyl thiophene, to form a thiophene-modified copolymer product and (2) reacting the copolymer product with a compound selected from the group consisting of (a) primary, normal, saturated, aliphatic alcohols having from about 12 to about 18 carbon atoms, (b) primary and secondary saturated, aliphatic amines having from about 12 to about 18 carbon atoms and (c) a mixture of primary, saturated, aliphatic amines containing from 8 to 18 carbon atoms and having an average of about 12 carbon atoms per molecule.

7. A mineral lubricating oil containing a minor proportion, sufficient to improve the viscosity index thereof, of the product obtained by (1) copolymerizing 1 mole of maleic anhydride with about 1 mole of a vinyl butyl ether in the presence of from about 0.25 mole to about 6 moles of thiophene, to form a thiophene-modified copolymer product and (2) reacting the copolymer product with a compound selected from the group consisting of (a) primary, normal, saturated, aliphatic alcohols having from about 12 to about 18 carbon atoms, (b) primary and secondary, saturated, aliphatic amines having from about 12 to about 18 carbon atoms, and (c) a mixture of primary, saturated, aliphatic amines containing from 8 to 18 carbon atoms and having an average of about 12 carbon atoms per molecule.

8. A mineral lubricating oil containing a minor proportion, sufficient to improve the viscosity index thereof, of the product obtained by (1) copolymerizing 1 mole of maleic anhydride with about 1 mole of octene-1 in the presence of from about 0.25 mole to about 6 moles of thiophene, to form a thiophene-modified copolymer product and (2) reacting the copolymer product with a compound selected from the group consisting of (a) primary, normal, saturated, aliphatic alcohols having from about 12 to about 18 carbon atoms, (b) primary and secondary, saturated, aliphatic amines having an average of from about 12 to about 18 carbon atoms, and (c) a mixture of primary, saturated, aliphatic amines containing from 8 to 18 carbon atoms and having an average of about 12 carbon atoms per molecule.

9. A mineral lubricating oil containing a minor proportion, sufficient to improve the viscosity index thereof, of the product obtained by (1) copolymerizing 1 mole of maleic anhydride with about 1 mole of vinyl acetate in the presence of from about 0.25 mole to about 6 moles of 3-methyl thiophene, to form a thiophene-modified copolymer product and (2) esterifying the copolymer product with lauryl alcohol.

10. A mineral lubricating oil containing a minor proportion, sufficient to improve the viscosity index thereof, of the product obtained by (1) copolymerizing 1 mole of maleic anhydride with about 1 mole of vinyl butyl ether in the presence of from about 0.25 mole to about 6 moles of thiophene, to form a thiophene-modified copolymer product and (2) esterifying the copolymer product with a mixture of primary, normal, saturated, aliphatic alcohols having an average of about 14 carbon atoms per molecule.

11. A mineral lubricating oil containing a minor proportion, sufficient to improve the viscosity index thereof, of the product obtained by (1) copolymerizing 1 mole of maleic anhydride with about 1 mole of octene-1 in the presence of from about 0.25 mole to about 6 moles of thiophene, to form a thiophene-modified copolymer product and (2) esterifying the copolymer product with a mixture of primary, normal, saturated, aliphatic alcohols having an average of about 14 carbon atoms per molecule.

JOHN J. GIAMMARIA.

REFERENCES CITED

The following references are of record in the file of this patent:

UNITED STATES PATENTS

| Number | Name | Date |
| --- | --- | --- |
| 2,047,398 | Voss | July 14, 1936 |
| 2,366,517 | Gleason | Jan. 2, 1945 |
| 2,475,409 | Smith | July 5, 1949 |
| 2,505,204 | Pitzer | Apr. 25, 1950 |